United States Patent [19]

Daugherty et al.

[11] Patent Number: 5,114,106
[45] Date of Patent: May 19, 1992

[54] UNIVERSAL CONTAINER HOLDING DEVICE

[76] Inventors: Rodney J. Daugherty; Debbra J. Daugherty, both of 4293 Lake Rd., Sheffield Lake, Ohio 44054

[21] Appl. No.: 712,060

[22] Filed: Jun. 7, 1991

[51] Int. Cl.⁵ .............................................. F16B 47/00
[52] U.S. Cl. .................................. 248/206.4; 248/315
[58] Field of Search ................... 248/311.2, 206.4, 315, 248/206.1; 47/39

[56] References Cited

U.S. PATENT DOCUMENTS

| | | | |
|---|---|---|---|
| 365,555 | 6/1887 | Tolman | 248/315 X |
| 469,216 | 2/1892 | Quinn | 248/315 X |
| 1,077,027 | 10/1913 | Austin | 248/315 |
| 2,360,224 | 10/1944 | Hannaford | 248/311.2 X |
| 3,516,801 | 6/1970 | Shah | 248/311.2 X |
| 3,623,641 | 11/1971 | Hanson et al. | 225/105 |
| 4,248,397 | 2/1981 | Casper | 248/138 |
| 4,286,742 | 9/1981 | Pellegrino | 224/281 |
| 4,634,089 | 1/1987 | Wright | 248/311 |
| 4,696,447 | 9/1987 | Strecker | 248/206 |
| 4,779,829 | 10/1988 | Rocke | 248/206.2 |
| 4,813,641 | 3/1989 | Wilson | 284/206.2 |
| 4,850,556 | 7/1989 | Otani | 248/206 |
| 4,951,909 | 8/1990 | Russo | 248/206 |
| 4,951,910 | 8/1990 | March | 248/311 |
| 5,028,026 | 7/1991 | Phillips et al. | 248/315 X |

FOREIGN PATENT DOCUMENTS 312149  2/1956  Czechoslovakia ............... 248/206.4

Primary Examiner—Alvin C. Chin-Shue

[57] ABSTRACT

A device for holding and affixing small plant containers to plate glass windows and other smooth surfaces such as formica, fiberglas and ceramic tile used in the home or on-board a boat or recreational vehicle. The device is formed out of a single piece of wire with suction cups attached at both ends and is of the top loading type comprising a formed ring section, a vertical leg and two horizontal legs. The formed ring section encompasses an opening for holding small containers with rimmed tops or tapered sides. The suction cups when affixed to a smooth surface are arranged in a vertical plane so that the ring section supports the container in a horizontal position.

5 Claims, 2 Drawing Sheets

UNIVERSAL CONTAINER HOLDING DEVICE

BACKGROUND OF THE INVENTION

This invention relates to the holding of containers, such as pots used to grow house plants, at a desired location and orientation on a smooth planar vertical surface such as window glass or the like.

Most small house plants in the home or work place thrive with a close proximity to sunlight. Heretofore the problems associated with displaying and arranging small plants near or at a window have been those of excessive occupancy of space required by shelving units, tables or other floor mounted or wall mounted supports. Also, hanging plant holders or wall anchored holders require attachment with screws or other similar fasteners causing the surfaces to which they are mounted to be damaged by fastener holes or disfigured by adhesives. Further because of their permanent or semi-permanent mounting they are not easily moved to a more suitable or appealing location such as a window or tiled wall.

Similar problems and situations exist on board pleasure boats used for recreational purposes. Further, plants on board boats cannot be placed upon shelves or tables without the risk of upsetting due to the movement of the boat in rough water or sudden maneuvers encountered. Also extreme care must be taken when using conventional fasteners, requiring holes, inside of boats. Similar problems exist inside of recreational vehicles such as motor homes, used on land.

The present invention overcomes known problems of prior art.

Accordingly, an important object is to provide a container such as a pot having a rimmed top or tapered sides such as that used to hold house plants, to be attached to a glass surface such as a window where the location is most desirable.

Yet another object of our invention is the ability of mounting to any smooth surface without marking or destroying the surface to which it is fastened such as a refrigerator, formica, ceramic tile or fiberglass panels and bulkheads such as those found on pleasure boats and recreational vehicles.

A still further object is to provide a holder that will remain unobtrusive when used with an aesthetically appealing container or plant.

These and other features of the present invention are provided in a unitary wire holder with conventional suction cups attached at its ends. The suction cups are used to attach the holder to a smooth planar vertical surface such as a window or tiled wall.

Other objects, features and advantages of the present invention include the simplicity it allows in inserting and removing containers such as house plant containers. Containers can be easily inserted and removed through the generous opening created by the circular formed ring section of the holder. The holder if attached to a window glass also allows the window to be opened and closed without having to remove the container or holder.

A further object is the simplicity and low cost of manufacturing the present invention.

BRIEF DESCRIPTION OF THE DRAWING FIGURES

DETAILED DESCRIPTION OF THE PREFERRED AND ALTERNATIVE EMBODIMENTS

Figure 1:
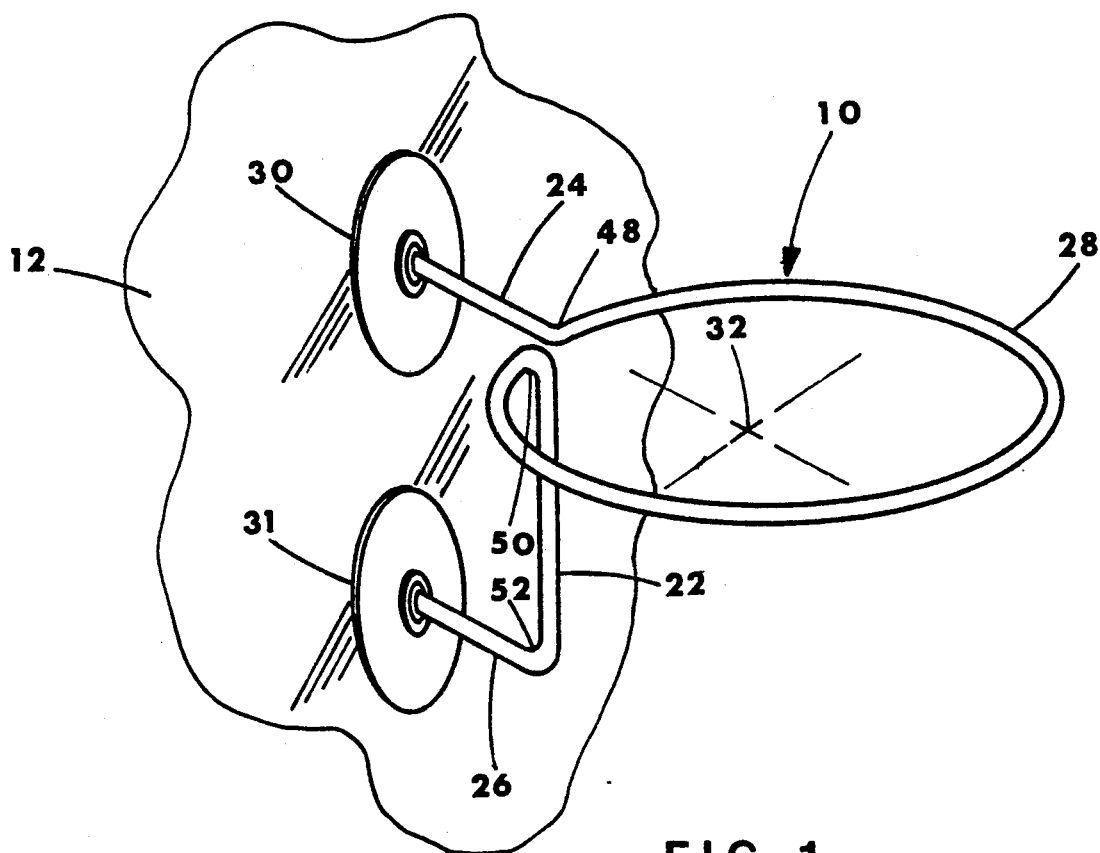
FIG. 1 is a perspective view of the holding device.

FIG. 1 illustrates the universal container holder generally referred to as numeral 10 attached to a plate glass window 12 in accordance with one embodiment of this invention. The holding device 10 is formed out of a single piece of material such as pre-coated wire.

The single piece wire is formed into a horizontal ring section 28 with one horizontal leg 24 bent ninety degrees from the vertical and one vertical leg 22 bent ninety degrees from the horizontal and a second horizontal leg 26 bent ninety degrees from the vertical. Both horizontal legs 24 and 26 are parallel and are on the same vertical plane as the center 32 of the ring section 28 and the vertical leg 22.

Figure 2:
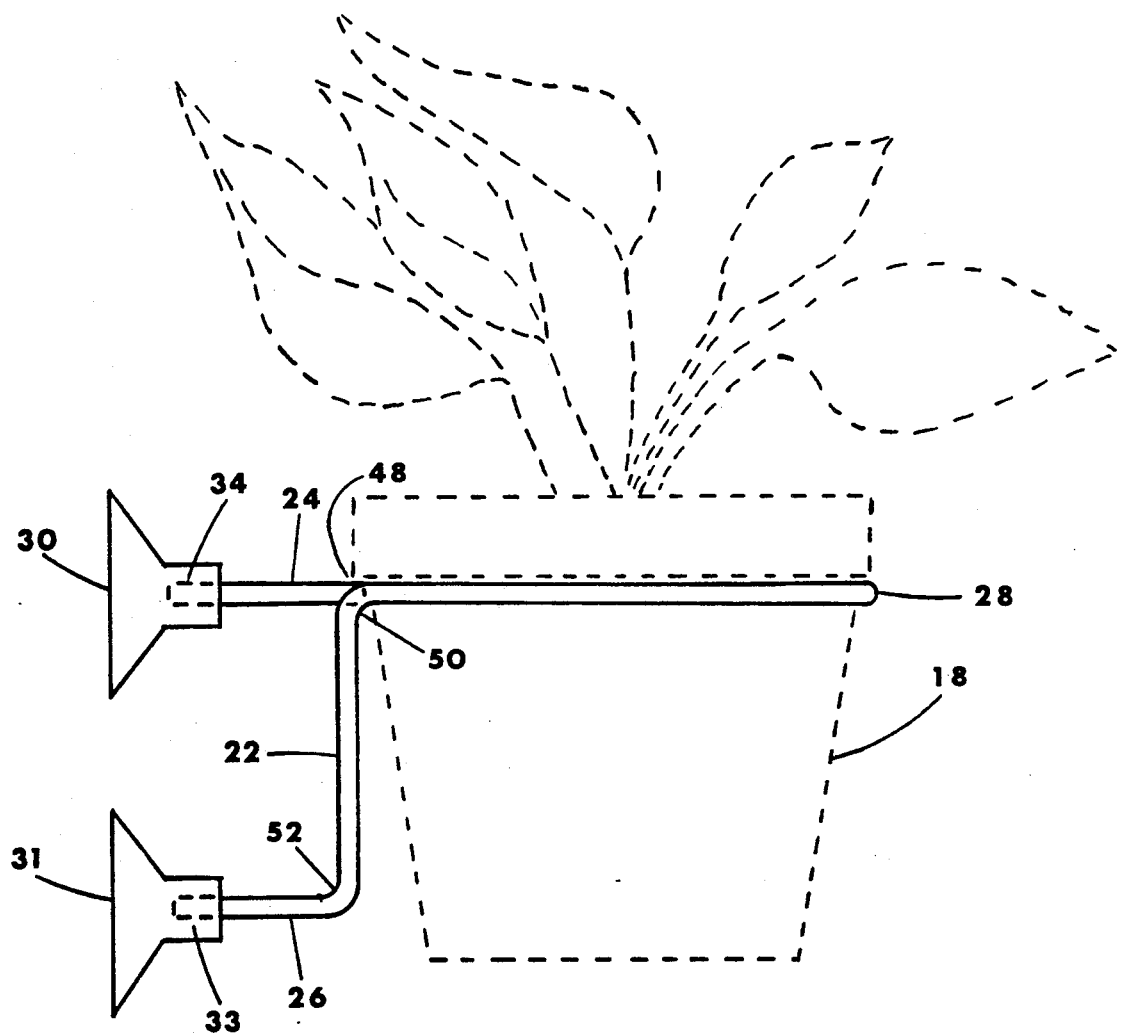
FIG. 2 is a side view of the holding device shown in FIG. 1 with a house plant and pot of the rimmed type shown in position therein.

Conventional suction cups 30 and 31 having apertures 33 and 34 in one side as shown in FIG. 2 are secured to the ends of the two horizontal legs 24 and 26. The suction cups 30 and 31 are made of an elastomeric material and will attach to smooth surfaces such as glass, fiberglass, ceramic tile, and appliances.

The vertical distance between the horizontal legs 24 and 26 is relative to the ring section 28 diameter so that the suction cups 30 and 31 are hidden from full view when a standard size household plant container 18 is inserted in the holder 10. The diameter of the ring section 28 is relative to the size of standard containers that are tapered from top to bottom and containers that are equipped with a rimmed top having a larger diameter than the body as shown in FIG. 2.

The suction cups 30 and 31 are sized according to the ring section 28 diameter and the maximum weight of a standard household plant container 18 of the size that can fit into the holder 10, as shown in FIG. 2.

Bends 48, 50 and 52 are of a radii allowing leg 24, leg 22 and leg 26 to be on the same vertical plane, accordingly legs 24 and 26 are of equal length. Hence, when suction cups 30 and 31 are attached to a planar vertical surface whereby suction cups 30 and 31 are on the same vertical axis, the ring section 28 will be horizontal such as shown in FIG. 2.

It will be appreciated that with the foregoing arrangement, the formed ring section defines an opening for holding small containers with rimmed tops or tapered sides. The containers are placed through the circular opening until the container's rimmed section rests on the top side of the formed ring section of the device. Also, containers without rimmed tops but having tapered sides can be held in place by inserting the container through the opening created by the ring section until the sides of the container are held in place by the force of the ring section acting against the sides of the container due to the increasing diameter of the container. Suction cups allow mounting to surfaces that otherwise would be damaged by fasteners requiring holes or adhesives. The suction cups, when affixed to a smooth surface, are arranged in a vertical plane so that the ring section supports the container in a horizontal position.

Although the invention has been described in connection with a preferred embodiment, modifications and alterations may be made without departing from the invention as defined by the appended claims.

We claim:

1. A device for holding a container compromising:

first and second spaced apart elongated substantially horizontal legs arranged in a common plane;

a ring section attached to one end of one of said legs and defining an opening for receiving the container;

a third leg interconnecting one end of the other of said spaced apart legs to said ring section;

said third leg being unconnected to and spaced from said one leg but arranged in said common plane with said first and seconds legs and extending substantially, vertically from said second leg to said ring section, and releasable attachment means on the other end of each of said first and second legs for releasably attaching said device on a surface with said ring section maintained in a horizontal plane.

2. The device of claim 1 wherein said opening is generally circular and said common plane passes through the center of said circular opening.

3. The device of claim 2 wherein said legs and said ring section are formed from a single continuous piece of material;

said releasable means comprising suction cups attached to said first and second legs.

4. The device of claim 3 wherein said first and second legs are of equal length.

5. The device of claim 1 wherein said ring section extends from said one leg to, and terminates at, said third leg.

* * * * *